(12) United States Patent
De Ren et al.

(10) Patent No.: US 10,399,852 B2
(45) Date of Patent: Sep. 3, 2019

(54) PROCESS AND APPARATUS FOR TREATING A SOUR SYNTHESIS GAS

(71) Applicant: UOP LLC, Des Plaines, IL (US)

(72) Inventors: Jan De Ren, Antwerp (BE); Bart J. T. Beuckels, Antwerp (BE); William J. Whyman, Collinsville, OK (US)

(*) Notice: Subject to any disclaimer, the term of this patent is extended or adjusted under 35 U.S.C. 154(b) by 146 days.

(21) Appl. No.: 15/593,156

(22) Filed: May 11, 2017

(65) Prior Publication Data

US 2018/0327263 A1    Nov. 15, 2018

(51) Int. Cl.

| | |
|---|---|
| *B01D 53/62* | (2006.01) |
| *B01D 53/34* | (2006.01) |
| *C10L 3/10* | (2006.01) |
| *C10K 1/00* | (2006.01) |
| *C01B 3/36* | (2006.01) |
| *C01B 3/50* | (2006.01) |
| *C01B 3/52* | (2006.01) |
| *C01B 3/56* | (2006.01) |
| *C01B 17/00* | (2006.01) |

(Continued)

(52) U.S. Cl.
CPC .............. *C01B 3/56* (2013.01); *B01D 53/047* (2013.01); *B01D 53/1462* (2013.01); *B01D 53/343* (2013.01); *B01D 53/62* (2013.01); *C01B 3/36* (2013.01); *C01B 3/52* (2013.01); *C01B 17/00* (2013.01); *B01D 2252/2021* (2013.01); *B01D 2252/2025* (2013.01); *B01D 2252/2026* (2013.01); *B01D 2252/20468* (2013.01); *B01D 2256/24* (2013.01); *B01D 2257/108* (2013.01); *B01D 2257/304* (2013.01); *B01D 2257/306* (2013.01); *B01D 2257/308* (2013.01); *B01D 2257/406* (2013.01); *B01D 2257/408* (2013.01); *B01D 2257/502* (2013.01); *B01D 2257/504* (2013.01); *C01B 32/50* (2017.08); *C01B 2203/0255* (2013.01); *C01B 2203/042* (2013.01); *C01B 2203/0415* (2013.01); *C01B 2203/0475* (2013.01); *C01B 2203/0485* (2013.01); *C01B 2203/1235* (2013.01); *C01B 2210/0004* (2013.01); *C01B 2210/005* (2013.01); *C01B 2210/0025* (2013.01); *C01B 2210/0053* (2013.01)

(58) Field of Classification Search
None
See application file for complete search history.

(56) References Cited

U.S. PATENT DOCUMENTS

| | | |
|---|---|---|
| 9,108,869 B2 | 8/2015 | Mazumdar et al. |
| 2009/0121191 A1 | 5/2009 | Tillman |

(Continued)

FOREIGN PATENT DOCUMENTS

| | | |
|---|---|---|
| CN | 103537163 A | 1/2014 |

*Primary Examiner* — Daniel Berns

(57) ABSTRACT

Processes and apparatuses for treating a sour synthesis gas are provided. The process comprises passing the sour synthesis gas stream to an acid gas removal unit to provide a treated synthesis gas stream and a $CO_2$ rich stream. At least a portion of the $CO_2$ rich stream is passed to a thermal oxidizer unit to provide a treated $CO_2$ gas stream. At least a portion of the treated synthesis gas stream is passed to a pressure swing adsorption unit to obtain a purified hydrogen stream and a tail gas stream. At least a portion of the tail gas stream is passed to the thermal oxidizer unit.

18 Claims, 1 Drawing Sheet

(51) Int. Cl.
*B01D 53/047* (2006.01)
*B01D 53/14* (2006.01)
*C01B 32/50* (2017.01)

(56) References Cited

U.S. PATENT DOCUMENTS

2011/0120012 A1   5/2011   Balmas et al.
2011/0296872 A1*  12/2011  Eisenberger ........... B01D 53/04
                                                    62/640

\* cited by examiner

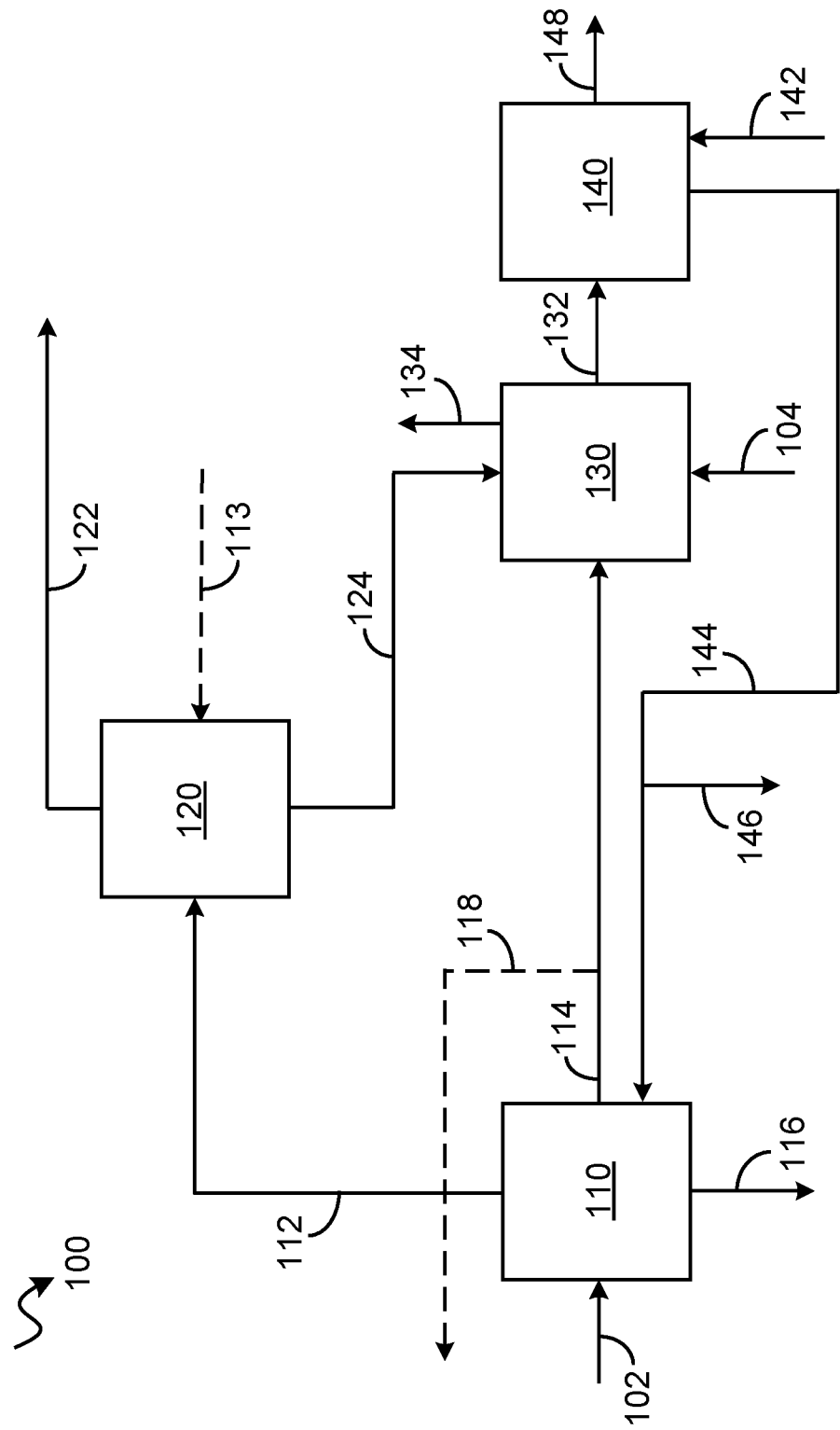

PROCESS AND APPARATUS FOR TREATING A SOUR SYNTHESIS GAS

TECHNICAL FIELD

The technical field generally relates to apparatuses and processes for treating a sour synthesis gas. More particularly, the present disclosure relates to integrated apparatus and processes for treating a sour synthesis gas for producing a purified hydrogen stream and recovering one or more acidic gases comprising $H_2S$, COS and $CO_2$ present in the sour synthesis gas.

BACKGROUND

Numerous methods for removal of acid gas from gas mixtures containing the same and recovering purified hydrogen gas are well known in the art and in commercial practice. Included among the known processes for acid gas removal from gaseous streams are those employing physical absorption of $CO_2$ and/or $H_2S$ as distinguished from other processes involving chemical reaction. Typical apparatuses required for conversion of sour synthesis gas from a shift or hydrolysis reactor into hydrogen in a hydrogen and/or ammonia producing gasification plant includes an acid gas removal unit for removal of acid gas components like $H_2S$, COS and $CO_2$ typically based by a physical solvent wash, e.g. UOP SeparALL™ process or UOP Selexol™ process. Alternatively, UOP Amine Guard™ FS Process may be used for the removal of acid gas components. This is required to meet the quality requirement of the synthesis gas feed to the downstream process to obtain purified hydrogen gas. Further, the apparatus includes a hydrogen purification unit which may use membrane technology, e.g. UOP Polysep™ membranes and/or Pressure Swing Adsorption (PSA) technology (e.g. UOP Polybed™ PSA Technology). High-purity hydrogen is needed in a variety of refinery and petrochemical processes. Further, destruction of CO, $H_2$ and other components presented in the $CO_2$ stream from acid gas removal unit may occur through systems including thermal or catalytic oxidizers. This is required to meet $CO_2$ quality requirements for further use.

A typical process and apparatus as described above requires a lot of steam consumption. Further, a significant amount of external fuel gas is required in the thermal oxidizer to provide the $CO_2$ rich gas stream. Moreover, there are significant challenges faced in increasing the amount of on-spec hydrogen gas in such hydrogen-producing gasification plants having the acid gas removal, thermal oxidizer and pressure swing adsorption units. Also, a significant amount of tail gas from the PSA bed is being directed to location outside the plant.

Accordingly, it is desirable to provide an improved process and apparatus for conversion of synthesis gas into hydrogen. Further, it is desirable for the instant apparatus and process to be a net steam producer rather than a steam consumer. Moreover, it is desirable to minimize the consumption of external fuel gas in the thermal oxidizer unit in such apparatuses. Additionally, it is desirable to increase the amount of purified hydrogen being produced from the synthesis gas. Furthermore, other desirable features and characteristics of the present subject matter will become apparent from the subsequent detailed description of the subject matter and the appended claims, taken in conjunction with the accompanying drawing and this background of the subject matter.

BRIEF SUMMARY

Various embodiments contemplated herein relate to apparatuses and processes for treatment of sour synthesis gas. The exemplary embodiments taught herein illustrate an integrated apparatus and processes for treating a sour synthesis gas for producing a purified hydrogen gas and recovering one or more acidic gases comprising $H_2S$, COS and $CO_2$ present in the sour synthesis gas.

In accordance with an exemplary embodiment, a process is provided for treating a sour synthesis gas and recovering one or more acidic gases comprising $H_2S$, COS and $CO_2$ present in the sour synthesis gas comprising passing a sour synthesis gas stream to an acid gas removal unit to provide a treated synthesis gas stream and a $CO_2$ rich stream. At least a portion of the $CO_2$ rich stream is passed to a thermal oxidizer unit to provide a treated $CO_2$ gas stream. At least a portion of the treated synthesis gas stream is passed to a pressure swing adsorption unit to obtain a purified hydrogen stream and a tail gas stream. At least a portion of the tail gas stream is passed to the thermal oxidizer unit.

In accordance with another exemplary embodiment, a process is provided for treating a sour synthesis gas and recovering one or more gases comprising $H_2S$, COS and $CO_2$ present in the sour synthesis gas comprising passing a sour synthesis gas stream to an acid gas removal unit to provide a treated synthesis gas stream and a $CO_2$ rich stream. At least a portion of the $CO_2$ rich stream is passed to a thermal oxidizer unit to provide a treated $CO_2$ gas stream. A flue gas produced in the thermal oxidizer unit is passed to a waste heat recovery unit. At least a portion of steam recovered from the waste heat recovery unit is passed to the acid gas removal unit. At least a portion of the treated synthesis gas stream is passed to a pressure swing adsorption unit to obtain a purified hydrogen stream and a tail gas stream.

In accordance with yet another exemplary embodiment, a process is provided for treating a sour synthesis gas and recovering one or more gases comprising $H_2S$, COS and $CO_2$ present in the sour synthesis gas comprising passing a sour synthesis gas stream to an acid gas removal unit to provide a treated synthesis gas stream and a $CO_2$ rich stream. At least a portion of the $CO_2$ rich stream is passed to a thermal oxidizer unit to provide a treated $CO_2$ gas stream. A flue gas produced in the thermal oxidizer unit is passed to a waste heat recovery unit. At least a portion of steam recovered from the waste heat recovery unit is passed to the acid gas removal unit. At least a portion of the treated synthesis gas stream is passed to a pressure swing adsorption unit to obtain a purified hydrogen stream and a tail gas stream. At least a portion of the tail gas stream is passed to the thermal oxidizer unit.

These and other features, aspects, and advantages of the present disclosure will become better understood upon consideration of the following detailed description, drawing and appended claims.

BRIEF DESCRIPTION OF THE DRAWING

The various embodiments will hereinafter be described in conjunction with the following FIGURE, wherein like numerals denote like elements.

The FIGURE illustrates an integrated complex for obtaining purified hydrogen from synthesis gas according to an embodiment of the present disclosure.

Corresponding reference characters indicate corresponding components throughout the several views of the drawing. Skilled artisans will appreciate that elements in the FIGURE are illustrated for simplicity and clarity and have not necessarily been drawn to scale. For example, the dimensions of some of the elements in the FIGURE may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DEFINITIONS

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, carbon dioxide, carbon monoxide, and sulfur and nitrogen compounds. Each of the above may also include aromatic and non-aromatic hydrocarbons.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As used herein, the term "rich" or "purified" can mean an amount of at least generally 50%, preferably 70%, and more preferably 90% by mole, of a compound or class of compounds in a stream.

As used herein, the term "substantially" can mean an amount of at least generally about 80%, preferably about 90%, and optimally about 99%, by weight, of a compound or class of compounds in a stream.

As depicted, process flow lines in the FIGURE can be referred to interchangeably as, e.g., lines, pipes, feeds, gases, products, discharges, parts, portions, or streams.

The term "communication" means that material flow is operatively permitted between enumerated components.

The term "passing" means that the material passes from a conduit or vessel to an object.

In the present disclosure, the term "pressure swing adsorption" refers to a type of process and apparatus that is well known and widely used with respect to separating the components of a gaseous mixture. A PSA system basically comprises passing a feed gas mixture through one or more adsorption beds containing a sieve material which has a greater selectivity for a more strongly adsorbed component than a more weakly adsorbed component of the gas mixture. In the operation of a typical 2-bed PSA system, the connecting conduits, valves, timers, and the like are coordinated and arranged so that when adsorption is occurring in a first bed, regeneration is occurring in a second bed. In the usual cycle, sequential steps with respect to each bed include bed pressurization, product release and venting.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments are directed to apparatuses and processes for treatment of sour synthesis gas to produce purified hydrogen and recovering one or more acid are described. An exemplary embodiment of the process and apparatus for producing purified hydrogen is addressed with reference to a process and apparatus 100 according to an embodiment as shown in the FIGURE. The process and apparatus 100 includes an acid gas removal unit 110, a hydrogen purification unit 120, a thermal oxidizer unit 130 and waste heat recovery unit 140.

In accordance with an exemplary embodiment as shown in the FIGURE, a sour synthesis gas stream in line 102 comprising one or more acidic gases may be passed to the acid gas removal unit 110. Synthesis gas may be interchangeably referred to as syngas and can be produced by conventional techniques such as gasification of a hydrocarbon-containing feedstock. As referred to herein, "sour synthesis gas stream" are synthesis gas stream that include the one or more acid gases. The sour synthesis gas stream is typically a mixture of hydrocarbons, hydrogen and one or more acid gases selected from the group consisting of carbon monoxide, carbon dioxide, and sulfur components as a result of the feeds employed to form the syngas. The sulfur components include any compound in the sour syngas stream that includes sulfur such as hydrogen sulfide ($H_2S$), carbonyl sulfide (COS) and the like. In accordance with an exemplary embodiment, syngas may be obtained from partial oxidation of a hydrocarbon containing feedstock. It is contemplated that the sour synthesis gas may be produced from a biomass, such as but not limited to steam reforming of biologically generated methane, direct gasification of biomass or gasification of charcoal or coke derived from biomass. In an exemplary embodiment, more than one syngas streams from different sources may be fed to the acid gas removal unit 110 in addition to the sour synthesis stream in line 102. Alternatively, in another exemplary embodiment, more than one syngas streams from various sources may be mixed to provide the sour synthesis stream in line 102.

The acid gas removal unit 110 may employ any of the conventional acid gas removal process well known in the art for removal of the acid gas and are incorporated within the scope of the present disclosure. In one example, acid gas removal uses a physical solvent (i.e., absorbent solvent) in countercurrent contacting flow with the sour synthesis gas stream. Examples of physical solvents include, but are not limited to, n-methyl-2-pyrrolidone, methanol, propylene carbonate, a mixture of dimethyl ethers of polyethylene glycol, and the like. During countercurrent contacting flow, the one or more acid gases present in the sour synthesis gas is absorbed into the physical solvent, which is in the liquid phase, to form a treated gas stream that is substantially free of acid gas and a loaded physical solvent stream that is partially or substantially saturated with the acid gas. Depending upon the vapor pressure of the physical solvent, some of the physical solvent may be entrained in the treated gas stream. Such a processes can be ideally suited for the selective removal of hydrogen sulfide ($H_2S$) and other sulfur compounds, or for the bulk removal of carbon dioxide (CO2). Such processes can also be used for removal of carbonyl sulfide (COS), mercaptans, ammonia, hydrogen cyanide (HCN) and metal carbonyls.

In accordance with an exemplary embodiment as shown, a treated synthesis gas stream in line 112 and a $CO_2$ rich stream in line 114 stream may be obtained from the acid gas removal unit 110. In accordance with an exemplary embodiment as shown in the FIGURE, a hydrogen sulfide rich stream in line 116 may be withdrawn from the acid gas removal unit 110. In accordance with an exemplary embodiment, one or more treated synthesis gas stream (not shown) may be obtained from the acid gas removal unit 110 in addition to the treated synthesis gas stream in line 112. In the instant aspect, the one or more synthesis gas stream may be sent for other uses. In accordance with another exemplary embodiment, one or more $CO_2$ rich streams (not shown) may be obtained from the acid gas removal unit in addition to the $CO_2$ rich stream in line 114. In the instant aspect, the one or more $CO_2$ rich stream may be sent for other uses. Further, in various embodiments, the hydrogen sulfide rich stream in line 116 from the acid gas removal unit may be passed to a sulfur recovery unit (not shown) to recover one or more sulfur compounds.

Referring back to the FIGURE, the treated synthesis gas stream in line 112 may be passed to the hydrogen purification unit 120. In an exemplary embodiment, a portion of the treated synthesis gas may be passed to the hydrogen purification unit 120. In accordance with an exemplary embodiment, other sources of treated synthesis stream may also be in communication with hydrogen purification unit 120. In accordance with the instant embodiment as discussed, the hydrogen purification unit 120 is a pressure swing adsorption unit and hence may be referred to as the pressure swing adsorption unit 120. However, other known methods and processes of obtaining purified hydrogen known in the art may be used. In an aspect, an optional nitrogen stream in line 113 may also be fed to the pressure swing adsorption unit 120. A purified hydrogen stream in line 122 and a tail gas stream in line 124 may be obtained from the pressure swing adsorption unit 120.

Referring back to the acid gas removal unit 110, at least a portion of the $CO_2$ rich stream from the acid gas removal unit 110 may be passed to the thermal oxidizer unit 130 to provide a treated CO2 gas stream. In accordance with an exemplary embodiment as shown in the FIGURE, the $CO_2$ rich stream in line 114 may be passed to thermal oxidizer unit 130 to provide a treated $CO_2$ gas stream in line 134. In accordance with an exemplary embodiment, other sources of $CO_2$ rich stream may also be in communication with the thermal oxidizer unit 130. In accordance with an exemplary embodiment as shown in the FIGURE, a portion of the $CO_2$ rich stream in line 118 may be withdrawn from the $CO_2$ rich stream in line 114 and sent to battery limits for other users.

In accordance with an exemplary embodiment as shown in the FIGURE, the thermal oxidizer unit 130 is in communication with the acid gas removal unit 110 through the $CO_2$ rich gas stream in line 114. Further, a fuel gas stream in line 104 may also be passed to the thermal oxidizer unit 130. Moreover, at least a portion of the tail gas stream may be passed to the thermal oxidizer unit 130. In accordance with an exemplary embodiment as shown in the FIGURE, the tail gas stream in line 124 may be passed to the thermal oxidizer unit 130. Although the tail gas stream in line 124 from the pressure swing adsorption unit 120 is shown in communication with the thermal oxidizer unit 130, however, additional sources of tail gas stream to the thermal oxidizer unit 130 are also contemplated. Further, an oxygen source (not shown) may also fed to the thermal oxidizer unit 130. Although the present disclosure has been explained with respect to a thermal oxidizer, however, use of catalytic oxidizer in alternative, or in addition to the thermal oxidizer unit may also be contemplated. In the thermal oxidizer unit, destruction of CO, $H_2$ and other components present in the $CO_2$ rich stream from acid gas removal unit 110 may take place. The thermal oxidizer unit 130 may be configured to oxidize/burn one or more impurities such as CO, $H_2$ present in the $CO_2$ rich stream in presence of the fuel gas stream in line 104 and presence of the oxygen source.

Typically, a significant amount of external fuel gas is required to process the $CO_2$ rich stream in the thermal oxidizer unit. In the instant disclosure, applicants have found that amount of an external source of fuel gas e.g. natural gas, syngas, is reduced by making use of an internal source i.e. the tail gas stream from the pressure swing adsorption unit. By sending tail gas stream in line 124 from the pressure swing adsorption unit 120 to the thermal oxidizer unit 130, less external fuel gas is required and hence resulting in fuel savings. In another exemplary embodiment, the tail gas stream in line 124 being fed to the thermal oxidizer unit is of reduced pressure. Typically, a tail gas pressure of 0.3-0.4 barg is required when the tail gas stream is sent to steam boilers. Applicants have found that increased hydrogen recovery is achieved by reducing the tail gas stream pressure from 0.3-0.4 barg, i.e. the inlet pressure required to steam boilers in the utility section of the plant, to 0.1 barg i.e. the inlet pressure required to the thermal oxidizer unit 130.

Referring back to the thermal oxidizer unit 130, a flue gas stream in line 132 and the treated $CO_2$ gas stream in line 134 is withdrawn from the thermal oxidizer unit 130. The treated $CO_2$ gas stream in line 134 may be passed to the atmosphere. The flue gas stream in line 132 may be passed to the waste heat recovery unit 140 to recover waste heat from the flue gas. The waste heat recovery unit 140 captures heat energy from the flue gas stream in line 132 and uses the captured heat energy to heat boiler feed water feed in line 142 to generate steam in line 144. Waste heat recovery unit 140 can be configured to generate steam at any process conditions desirable. In accordance with an exemplary embodiment, waste heat recovery unit 140 can be configured to generate medium or high pressure steam. At least a portion of the steam generated from the waste heat recovery unit 140 may be passed to the acid gas removal unit 110. The steam stream may be used by used by a reboiler in the acid gas removal unit 110 and hence decreasing external steam requirements. In accordance with an exemplary embodiment as shown in the FIGURE, the steam stream in line 144 may be passed to the acid gas removal unit 110. Further, in an exemplary aspect as shown in the FIGURE, a portion of the steam stream in line 146 may be taken from the steam stream in line 144 and may be sent can be sent to the steam grid or to other units that are part of the plant comprising the apparatus 100. Further, a spent flue gas stream may exit the waste heat recovery unit 140 in line 148.

In the instant process and apparatus 100 as described above, one or more operating parameters of the acid gas removal unit 110 and the pressure swing adsorption unit 120 may be controlled to maximize an amount of purified hydrogen stream produced per unit of the sour synthesis gas stream. In an aspect, the operating parameters are controlled by a control system. In accordance with an exemplary embodiment, an amount of an external fuel gas being provided to the thermal oxidizer may be minimized and the amount of the tail gas stream being provided to the thermal oxidizer unit may be maximized via one or more control modules. In another exemplary embodiment, the amount of steam recovered from the waste heat recovery unit may be maximized via a steam recovery module. Each control system and the one or more control modules may include any suitable structure for interacting with one or more sensors and controlling one or more actuators. Each controller could, for example, represent a multivariable controller, such as a [Robust Multivariable Predictive Control Technology (RMPCT)] controller or other type of controller implementing [model predictive control (MPC)] or other [advanced predictive control (APC)]. As a particular example, each controller could represent a computing device running a real-time operating system.

In some embodiments, various functions described herein are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a sour synthesis gas and recovering one or more acidic gases comprising $H_2S$, COS and $CO_2$ present in the sour synthesis gas, the process comprising passing a sour synthesis gas stream to an acid gas removal unit to provide a treated synthesis gas stream and a $CO_2$ rich stream; passing at least a portion of the $CO_2$ rich stream to a thermal oxidizer unit to provide a treated $CO_2$ gas stream; passing at least a portion of the treated synthesis gas stream to a pressure swing adsorption unit to obtain a purified hydrogen stream and a tail gas stream; and passing at least a portion of the tail gas stream to the thermal oxidizer unit. An embodiment of the invention is one, any or all of prior embodiments in this paragraph up through the first embodiment in this paragraph further comprising passing a flue gas produced in the thermal oxidizer unit to a waste heat recovery unit. An embodiment of the invention is one, any or all of prior embodiments in this paragraph up through the first embodiment in this paragraph further comprising passing at least a portion of steam recovered from the waste heat recovery unit to the acid gas removal unit. An embodiment of the invention is one, any or all of prior embodiments in this paragraph up through the first embodiment in this paragraph further comprising obtaining a hydrogen sulfide rich stream from the acid gas removal unit and passing the hydrogen sulfide rich stream to a sulfur recovery unit to recover one or more sulfur compounds. An embodiment of the invention is one, any or all of prior embodiments in this paragraph up through the first embodiment in this paragraph, wherein one or more impurities comprising carbon monoxide and hydrogen present in the $CO_2$ rich stream are removed via oxidation in the thermal oxidizer unit. An embodiment of the invention is one, any or all of prior embodiments in this paragraph up through the first embodiment in this paragraph further comprising obtaining the sour synthesis gas from partial oxidation of a hydrocarbon containing feedstock. An embodiment of the invention is one, any or all of prior embodiments in this paragraph up through the first embodiment in this paragraph, wherein the tail gas stream being passed to the thermal oxidizer unit is of reduced pressure. An embodiment of the invention is one, any or all of prior embodiments in this paragraph up through the first embodiment in this paragraph further comprising controlling one or more operating parameters of the acid gas removal unit and the pressure swing adsorption unit to maximize an amount of purified hydrogen stream produced per unit of the sour synthesis gas stream. An embodiment of the invention is one, any or all of prior embodiments in this paragraph up through the first embodiment in this paragraph further comprising minimizing an amount of an external fuel gas being provided to the thermal oxidizer and maximizing the amount of the tail gas stream being provided to the thermal oxidizer unit via one or more control modules. An embodiment of the invention is one, any or all of prior embodiments in this paragraph up through the first embodiment in this paragraph further comprising maximizing the amount of stream recovered from the waste heat recovery unit via a steam recovery module.

A second embodiment of the invention is a process for treating a sour synthesis gas and recovering one or more gases comprising $H_2S$, COS and $CO_2$ present in the sour synthesis gas, the process comprising passing a sour synthesis gas stream to an acid gas removal unit to provide a treated synthesis gas stream and a $CO_2$ rich stream; passing at least a portion of the $CO_2$ rich stream to a thermal oxidizer unit to provide a treated $CO_2$ gas stream; passing a flue gas produced in the thermal oxidizer unit to a waste heat recovery unit; passing at least a portion of steam recovered from the waste heat recovery unit to the acid gas removal unit; and passing at least a portion of the treated synthesis gas stream to a pressure swing adsorption unit to obtain a purified hydrogen stream and a tail gas stream. An embodiment of the invention is one, any or all of prior embodiments in this paragraph up through the second embodiment in this paragraph further comprising passing at least a portion of the tail gas stream to the thermal oxidizer unit. An embodiment of the invention is one, any or all of prior embodiments in this paragraph up through the second embodiment in this paragraph, wherein the tail gas stream being passed to the thermal oxidizer unit is of reduced pressure. An embodiment of the invention is one, any or all of prior embodiments in this paragraph up through the second embodiment in this paragraph further comprising obtaining a hydrogen sulfide rich stream from the acid gas removal unit and passing the hydrogen sulfide rich stream to a sulfur recovery unit to recover one or more sulfur compounds. An embodiment of the invention is one, any or all of prior embodiments in this paragraph up through the second embodiment in this paragraph, wherein one or more impurities comprising carbon monoxide and hydrogen present in the $CO_2$ rich stream are removed via oxidation in the thermal oxidizer unit. An embodiment of the invention is one, any or all of prior embodiments in this paragraph up through the second embodiment in this paragraph further comprising obtaining the sour synthesis gas from partial oxidation of a hydrocarbonaceous fuel.

A third embodiment of the invention is a process for treating a sour synthesis gas and recovering one or more gases comprising $H_2S$, COS and $CO_2$ present in the sour synthesis gas, the process comprising passing a sour synthesis gas stream to an acid gas removal unit to provide a treated synthesis gas stream and a $CO_2$ rich stream; passing at least a portion of the $CO_2$ rich stream to a thermal oxidizer unit to provide a treated $CO_2$ gas stream; passing a flue gas produced in the thermal oxidizer unit to a waste heat recovery unit; passing at least a portion of steam recovered from the waste heat recovery unit to the acid gas removal unit; passing at least a portion of the treated synthesis gas stream to a pressure swing adsorption unit to obtain a purified hydrogen stream and a tail gas stream; and passing at least a portion of the tail gas stream to the thermal oxidizer unit. An embodiment of the invention is one, any or all of prior embodiments in this paragraph up through the third embodiment in this paragraph, wherein the tail gas stream being passed to the thermal oxidizer unit is of reduced pressure. An embodiment of the invention is one, any or all of prior embodiments in this paragraph up through the third embodiment in this paragraph further comprising obtaining a hydrogen sulfide rich stream from the acid gas removal unit and passing the hydrogen sulfide rich stream to a sulfur recovery unit to recover one or more sulfur compounds. An embodiment of the invention is one, any or all of prior embodiments in this paragraph up through the third embodiment in this paragraph, wherein one or more impurities comprising carbon monoxide and hydrogen present in the $CO_2$ rich stream are removed via oxidation in the thermal oxidizer unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated. In the foregoing, all temperatures are set forth in degrees Celsius and, all parts and percentages are by weight, unless otherwise indicated.

The invention claimed is:

1. An integrated process for treating a sour synthesis gas and recovering one or more acidic gases comprising $CO_2$ present in the sour synthesis gas, the process comprising:
   (a) passing a sour synthesis gas stream to an acid gas removal unit to provide a treated synthesis gas stream and a $CO_2$ rich stream;
   (b) passing at least a portion of the $CO_2$ rich stream to a thermal oxidizer unit to provide a treated $CO_2$ gas stream;
   (c) passing at least a portion of the treated synthesis gas stream to a pressure swing adsorption unit to obtain a purified hydrogen stream and a tail gas stream; and
   (d) passing at least a portion of the tail gas stream obtained from the pressure swing adsorption unit to the thermal oxidizer unit, further comprising passing a flue gas produced in the thermal oxidizer unit to a waste heat recovery unit, and further comprising passing at least a portion of steam recovered from the waste heat recovery unit to the acid gas removal unit.

2. The process of claim 1 further comprising obtaining a hydrogen sulfide rich stream from the acid gas removal unit and passing the hydrogen sulfide rich stream to a sulfur recovery unit to recover one or more sulfur compounds.

3. The process of claim 1 wherein one or more impurities comprising carbon monoxide and hydrogen present in the $CO_2$ rich stream are removed via oxidation in the thermal oxidizer unit.

4. The process of claim 1 further comprising obtaining the sour synthesis gas from partial oxidation of a hydrocarbon containing feedstock.

5. The process of claim 1 wherein the tail gas stream being passed to the thermal oxidizer unit is of reduced pressure.

6. The process of claim 1 further comprising controlling one or more operating parameters of the acid gas removal unit and the pressure swing adsorption unit to maximize an amount of purified hydrogen stream produced.

7. The process of claim 1 further comprising minimizing an amount of an external fuel gas being provided to the thermal oxidizer and maximizing the amount of the tail gas stream being provided to the thermal oxidizer unit via one or more control modules.

8. The process of claim 1 further comprising maximizing the amount of steam recovered from the waste heat recovery unit via a steam recovery module.

9. An integrated process for treating a sour synthesis gas and recovering one or more gases comprising $CO_2$ present in the sour synthesis gas, the process comprising:
   (a) passing a sour synthesis gas stream to an acid gas removal unit to provide a treated synthesis gas stream and a $CO_2$ rich stream;
   (b) passing at least a portion of the $CO_2$ rich stream to a thermal oxidizer unit to provide a treated $CO_2$ gas stream;
   (c) passing a flue gas produced in the thermal oxidizer unit to a waste heat recovery unit;
   (d) passing at least a portion of steam recovered from the waste heat recovery unit to the acid gas removal unit; and
   (e) passing at least a portion of the treated synthesis gas stream to a pressure swing adsorption unit to obtain a purified hydrogen stream and a tail gas stream.

10. The process of claim 9 further comprising passing at least a portion of the tail gas stream to the thermal oxidizer unit.

11. The process of claim 9 wherein the tail gas stream being passed to the thermal oxidizer unit is of reduced pressure.

12. The process of claim 9 further comprising obtaining a hydrogen sulfide rich stream from the acid gas removal unit and passing the hydrogen sulfide rich stream to a sulfur recovery unit to recover one or more sulfur compounds.

13. The process of claim 9 wherein one or more impurities comprising carbon monoxide and hydrogen present in the $CO_2$ rich stream are removed via oxidation in the thermal oxidizer unit.

14. The process of claim 9 further comprising obtaining the sour synthesis gas from partial oxidation of a hydrocarbonaceous fuel.

15. An integrated process for treating a sour synthesis gas and recovering one or more gases comprising $CO_2$ present in the sour synthesis gas, the process comprising:
   (a) passing a sour synthesis gas stream to an acid gas removal unit to provide a treated synthesis gas stream and a $CO_2$ rich stream;
   (b) passing at least a portion of the $CO_2$ rich stream to a thermal oxidizer unit to provide a treated $CO_2$ gas stream;
   (c) passing a flue gas produced in the thermal oxidizer unit to a waste heat recovery unit;

(d) passing at least a portion of steam recovered from the waste heat recovery unit to the acid gas removal unit;

(e) passing at least a portion of the treated synthesis gas stream to a pressure swing adsorption unit to obtain a purified hydrogen stream and a tail gas stream; and (f) passing at least a portion of the tail gas stream to the thermal oxidizer unit.

16. The process of claim 15 wherein the tail gas stream being passed to the thermal oxidizer unit is of reduced pressure.

17. The process of claim 15 further comprising obtaining a hydrogen sulfide rich stream from the acid gas removal unit and passing the hydrogen sulfide rich stream to a sulfur recovery unit to recover one or more sulfur compounds.

18. The process of claim 15 wherein one or more impurities comprising carbon monoxide and hydrogen present in the $CO_2$ rich stream are removed via oxidation in the thermal oxidizer unit.

* * * * *